United States Patent
Penella (10) Patent No.: US 11,554,846 B2
(45) Date of Patent: Jan. 17, 2023

(54) DEVICE FOR RELEASING AN AIRCRAFT PANEL AND ASSOCIATED AIRCRAFT

(71) Applicant: AIRBUS HELICOPTERS, Marignane (FR)

(72) Inventor: Daniel Penella, Orgon (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/323,123

(22) Filed: May 18, 2021

(65) Prior Publication Data
US 2021/0371078 A1  Dec. 2, 2021

(30) Foreign Application Priority Data

May 28, 2020  (FR) ...................................... 2005659

(51) Int. Cl.
*B64C 1/14* (2006.01)
*B64C 1/32* (2006.01)

(52) U.S. Cl.
CPC .............. *B64C 1/1446* (2013.01); *B64C 1/32* (2013.01)

(58) Field of Classification Search
CPC ....... B64C 1/1446; B64C 1/32; B64C 1/1461; B64C 1/1476; F16B 21/12; F16B 21/125; F16B 21/186; F16B 21/18; F16B 39/04; F16B 21/14; F16B 21/16; B60J 9/02
See application file for complete search history.

(56) References Cited

U.S. PATENT DOCUMENTS

| | | | | |
|---|---|---|---|---|
| 3,741,592 A | * | 6/1973 | Muncy | F16B 5/0266 403/377 |
| 4,220,298 A | | 9/1980 | Willis | |
| 4,298,299 A | * | 11/1981 | Quarles | F16B 21/12 24/581.1 |
| 4,733,987 A | * | 3/1988 | Tomlinson | F16B 21/186 285/305 |
| 5,324,152 A | | 6/1994 | Anderson, IV | |
| 6,308,918 B1 | | 10/2001 | Ferrier | |

(Continued)

FOREIGN PATENT DOCUMENTS

| | | |
|---|---|---|
| EP | 0019024 A1 * | 11/1980 |
| EP | 0019024 A1 | 11/1980 |

(Continued)

OTHER PUBLICATIONS

Flight-Mechanic, archived on May 18, 2016, https:/ /web.archive.org/web/20180328225001 /http:/ /www.flight-mechanic.com:80/safetying-methods-part-three/ (Year: 2016).*

(Continued)

*Primary Examiner* — Joshua J Michener
*Assistant Examiner* — Cindi M Curry
(74) *Attorney, Agent, or Firm* — Brooks Kushman P.C.

(57) ABSTRACT

A device for releasing a panel of an aircraft, the device being configured to be secured to a support, the support having an opening and the device being attached to cover a periphery of the opening, the device comprising a panel configured to be arranged at least opposite the opening. Such a device comprises: at least two ejector members, each of the at least two ejector members comprising at least one link; and at least one control member for applying a pulling force to the at least one link.

20 Claims, 5 Drawing Sheets

(56) References Cited

U.S. PATENT DOCUMENTS

| | | | |
|---|---|---|---|
| 7,568,855 B2 * | 8/2009 | Fitzler | F16B 21/183 |
| | | | 411/522 |
| 2008/0038081 A1 | 2/2008 | Davis | |
| 2016/0298378 A1 * | 10/2016 | Desai | B60J 1/085 |

FOREIGN PATENT DOCUMENTS

| | | |
|---|---|---|
| EP | 3476718 A1 | 5/2019 |
| FR | 2766156 A1 | 1/1999 |
| FR | 3072937 A1 | 5/2019 |
| GB | 526648 A | 9/1940 |
| WO | 9907600 A1 | 2/1999 |
| WO | 2017208157 A1 | 12/2017 |

OTHER PUBLICATIONS

Headquarters, Department of the Army, Tm 1-1500-204-23-6, Jul. 31, 1992 (Year: 1992).*

French Search Report for French Application No. FR2005659, Completed by the French Patent Office, dated Feb. 12, 2021, 8 pages.

\* cited by examiner

DEVICE FOR RELEASING AN AIRCRAFT PANEL AND ASSOCIATED AIRCRAFT

CROSS REFERENCE TO RELATED APPLICATIONS

This application claims priority to French patent application No. FR 20 05659 filed on May 28, 2020, the disclosure of which is incorporated in its entirety by reference herein.

TECHNICAL FIELD

The present disclosure relates to the field of aircraft such as, in particular, airplanes or rotorcraft. Such aircraft generally comprise doors, walls or portholes for closing an opening formed in a fuselage. For the purpose of textual simplicity, the term "panel" used hereinafter in the present application may thus denote a door, a wall or a porthole and may be totally or partially transparent or translucent.

BACKGROUND

In the event that the aircraft has an accident, such a panel needs to be opened or retracted as quickly as possible in order to allow the aircraft crew and/or passengers to exit the aircraft.

Therefore, equipping such panels with emergency means allowing them to be retracted is known.

For example, document WO9907600 describes emergency means having latches. Cables are used to actuate these latches that are able to rotate or move in translation relative to a frame secured to the fuselage or to a structure of the aircraft. Moreover, an actuator is connected to the cables and allows a pulling force to be applied to the cables.

Such latches are therefore able to move between a working position in which they hold the panel in position in order to close the opening in a sealed manner and a retracted position in which the panel can be pushed out manually by a person.

However, when the latches are arranged in their retracted positions, it is therefore necessary, after the aircraft has had an accident, for a person to have sufficient physical strength to push out and possibly lift the panel. Moreover, such a panel may have a significant weight preventing an injured person or a child from easily pushing it out of the aircraft.

Furthermore, as described in document FR 2 766 156, another type of emergency means has also been designed that makes it possible to retract a porthole by cutting a seal arranged at the periphery of this porthole.

Document FR 3 072 937 describes emergency means comprising a release key and a special seal arranged at the periphery of a porthole Such a seal is configured to allow a person to manually eject the porthole if the aircraft has an accident. This ejection is implemented by applying a force substantially perpendicular to the inner surface of the panel.

Document GB 526 648 describes another emergency means for actuating a pivoting emergency door by means of a lever. In the event of an accident, a person must apply manual force to this lever in order to be able to exit the aircraft.

Moreover, document EP 0 019 024 discloses a device for releasing a panel equipping a support of a vehicle such as a bus or a coach for transporting passengers.

Such a device comprises, in particular, four ejector members allowing the panel to be swiftly released by means of pins cooperating with studs. Such pins are actuated by means of cables connected to two handles that can be actuated respectively from outside and inside the vehicle.

The ejector members also comprise coil springs arranged around the studs. Each spring bears at a first end on a pin and at a second end on the support of the vehicle.

Such a device therefore needs to be assembled directly on the vehicle and cannot constitute a pre-mounted assembly.

SUMMARY

The object of the present disclosure is therefore to propose a device for releasing a panel that helps overcome the above-mentioned limitations. Indeed, this device for releasing a panel is optimized to require minimal actuation force to eject the panel initially arranged at the opening.

Another object of the disclosure is to be able to easily and quickly assemble the release device on a support.

The disclosure therefore relates to a device for releasing an aircraft panel, the device being configured to be secured to a support, the support having an opening and the device being attached to cover a periphery of the opening, the device comprising:

a panel configured to be arranged at least opposite the opening, at least two ejector members, each of the at least two ejector members comprising:

a stud extending in a longitudinal direction oriented perpendicular to the panel;

a spring pre-loaded in compression in the longitudinal direction, the spring being arranged coaxially around the stud; and a removable pin cooperating with the stud, the removable pin being configured such that, in a working position, it holds the stud in position and allows the panel to be secured to the support and, in a release position, it releases the stud;

at least one link connected to the removable pins of the at least two ejector members; and at least one control member for applying a pulling force to the link or links and for simultaneously arranging the removable pins of the at least two ejector members in their respective release positions.

In other words, the device is intended to be secured to the support, for example by gluing, clamping and/or riveting. The panel is then positioned covering the opening of the support at an outer face of the aircraft.

Such a panel may be formed, for example, from an opaque material. Alternatively, the panel may comprise a porthole that is partially or totally transparent or translucent and/or has a screen print or a film arranged on the periphery in order to conceal the means for securing the device on the support. Moreover, such a panel may be in different forms and may be formed by a door or a hatch.

Ejector members are thus distributed, for example, on at least two opposing sides of the panel. Such ejector members may be used, if necessary, if the aircraft has an accident, to disengage and release the panel initially held in position on the support of the aircraft.

Such ejector members are simultaneously actuated by means of one or more control members and one or more links connected to the removable pins of each ejector member.

The links may advantageously comprise metal cables, wires, sheaths, rods or bars. Systems for adjusting the tension of the links may also be used to facilitate the adjustment and synchronization of the simultaneous actuation of the various ejector members.

Moreover, different links may be arranged in parallel, each comprising a first end connected to the same control member. At least one second end of the links cooperates respectively with a dedicated removable pin.

According to another variant, a single link may be used or several links may be arranged in series with each other. In this case, a first link may cooperate with the control member and a first removable pin and a second link may be arranged between the first removable pin and a second removable pin.

According to the disclosure, such a device is remarkable in that it comprises a frame configured to be secured to the support, the frame being interposed between the support and the panel, the springs of the at least two ejector members being respectively arranged between the frame and the panel.

The springs are therefore compressed between the frame and the panel when the panel is fastened to the frame. The springs help eject the panel when the removable pins are moved respectively from their working positions to their release positions.

One end of the studs emerging on the outside of the aircraft may comprise a countersunk or dome head cooperating with a cup washer positioned between the countersunk or dome head and the panel. Moreover, the stud or studs may pass through a first aperture provided in the panel then a second aperture provided in the frame.

According to one alternative, the stud or studs may also be directly formed in the material of the panel. In this case, the stud or studs only pass through one aperture provided in the frame.

Regardless of the embodiment of the studs, the frame may advantageously be formed from a composite material and be shaped to conform to an external shape of the support of the aircraft. Moreover, a reinforcing sleeve may also be secured to the frame in order to allow the flushness or non-flushness of the panel and the outer face of the aircraft to be adjusted.

Such a device for releasing an aircraft panel has the advantage, in particular, of being delivered pre-mounted and then attached directly onto a support. The frame is thus secured to the support and the seals are already arranged between the frame and the panel. Only an adjustment of the flushness of the panel relative to the outer face of the aircraft can be made.

Moreover, one or more seals can be inserted between the frame and the panel in order to ensure a tight seal at this connection. For example, flange and/or lip seals may be used in order to provide such a tight seal.

Other sealing means may also be arranged in the first aperture of the panel and in the second aperture of the frame in order to ensure a tight seal with the studs.

According to a first embodiment, the control member or members may be configured to be actuated manually.

Moreover, such a release device may allow any person, regardless of his or her physical strength, to actuate the release of a panel initially secured with the support. The release device is thus configured such that the force required to actuate the removable pins with the control member is predetermined and preferably minimal.

Advantageously, the control member or members may comprise a lever with a degree of rotational mobility in relation to the frame.

In other words, such a lever is arranged in a pivotal connection with the frame. Rotational guide means such as bearings or bushings may be interposed between the lever and the frame.

According to a second embodiment, the control member or members may comprise at least one actuator configured to be controlled remotely.

Such an actuator may be controlled, for example, by an electrical, hydraulic or pneumatic control setpoint. This control setpoint may thus be generated automatically by a safety system that has detected an event such as an emergency landing, in particular, or indeed manually by a pilot of the aircraft pressing a control button remote from the release device.

Moreover, the two embodiments may advantageously be combined with each other and allow both manual release of the panel by actuating a lever positioned next to the panel and remote-controlled release by means of an actuator, for example an electrically controlled actuator.

Advantageously, at least one of the removable pins may comprise a breakable portion, this breakable portion being configured to break when the pulling force reaches a predetermined threshold value. When the breakable portion or portions are broken, the removable pin or pins can switch respectively from their working positions to their release positions.

Such a breakable portion thus allows the integrity of all the ejector members to be inspected visually. This breakable portion also allows a removable pin to be kept in the working position regardless of the stresses and vibrations to which the aircraft is subjected. Moreover, the shape, the material and the dimensions of a breakable portion allow the force required to actuate at least one of the removable pins equipped with this breakable portion to be adapted.

According to another aspect of the disclosure, the removable pin or pins can each comprise two free ends, each breakable portion being secured with the two free ends once the removable pin or pins are arranged in their working positions.

Therefore, depending on the type of stud equipping the device, different types of complementary removable pins can be used.

According to a first embodiment of the disclosure, at least one of the studs may comprise at least one circular groove arranged at an external cylindrical face of the stud. In order to position the removable pin or pins in their respective working positions, the two free ends may be inserted respectively into the circular groove of the stud or studs.

The removable pin or pins may optionally be formed from an elastic material, in particular a metal wire or a thin metal sheet. In this case, in order to position the removable pin or pins in their respective working positions, the pin or pins are deformed in order to allow the two free ends to be inserted into the circular groove of the stud or studs. The two free ends move apart from each other and then back towards each other in such a way as to prevent the stud with which they are cooperating from being extracted. The removable pins may be lyre-shaped or omega-shaped, their shape resembling that of the Greek letter "Ω".

Once the circular groove has been traversed by the two free ends, a breakable portion can be attached in order to connect these two free ends together. Such a breakable portion therefore prevents the free ends from being accidentally extracted through the circular groove.

According to a second embodiment of the disclosure, at least one of the studs may comprise at least one hole oriented transversely relative to the respective longitudinal direction of the stud or studs.

In order to position the removable pins in their respective working positions, at least one of the two free ends may be inserted through the hole or holes.

The removable pins may thus be formed from an elastic material, in particular a metal wire. For example, these removable pins may be of the "beta" type, their shape resembling that of the Greek letter "β", also referred to as an "R-clip" due to their resemblance to the letter "R".

When positioning the removable pin or pins in their respective working positions, once the hole or holes are traversed by at least one of the free ends, a breakable portion can be attached in order to connect the two free ends together. Such a breakable portion therefore prevents a free end from accidentally being extracted through the hole.

Moreover, and regardless of the embodiment of the disclosure, the breakable portion can be formed by a snap wire.

Indeed, such a snap wire is suitable for connecting the two free ends of a removable pin and for breaking when a pulling force of a predetermined strength is applied to the removable pin. The snap wire may advantageously be inserted into holes provided radially in each of the two free ends of a removable pin. Such a snap wire may also be referred to as a safety wire or lockwire. This snap wire is advantageously metal and is very precisely calibrated. In practice, such a snap wire may have a diameter of between 0.1 mm and 2 mm and preferably between 0.5 mm and 1.5 mm.

According to another aspect of the disclosure, the opening possibly comprising four sides, the device may comprise eight ejector members positioned in pairs at each of the four sides of the opening.

Indeed, such an arrangement helps distribute the thrust force generated by the various ejector members at the four sides forming the aircraft panel.

The object of the present disclosure is also an aircraft comprising a support having an opening and a device for releasing an aircraft panel, the device being secured to the support and being attached to cover a periphery of the opening, the panel being arranged at least opposite the opening.

According to the disclosure, such an aircraft is remarkable in that the release device is as previously described.

In other words, the aircraft comprises a device comprising:

at least two ejector members, each of the at least two ejector members comprising:

a stud extending in a longitudinal direction oriented perpendicular to the panel;

a spring pre-loaded in compression in the longitudinal direction, the spring being arranged coaxially around the stud; and a removable pin cooperating with the stud, the removable pin being configured such that, in a working position, it holds the stud in position and allows the panel to be secured to the support and, in a release position, it releases the stud;

at least one link connected to the removable pins of the at least two ejector members; and at least one control member for applying a pulling force to the link or links and for simultaneously arranging the removable pins of the at least two ejector members in their respective release positions.

Such an aircraft can thus facilitate the releasing of a panel if the aircraft has an accident.

BRIEF DESCRIPTION OF THE DRAWINGS

The disclosure and its advantages appear in greater detail from the following description of examples given by way of illustration with reference to the accompanying figures, in which.

DETAILED DESCRIPTION

Elements present in more than one of the figures are given the same references in each of them.

The disclosure therefore relates to the field of devices for releasing aircraft panels and to aircraft equipped in this way.

Figure 1:
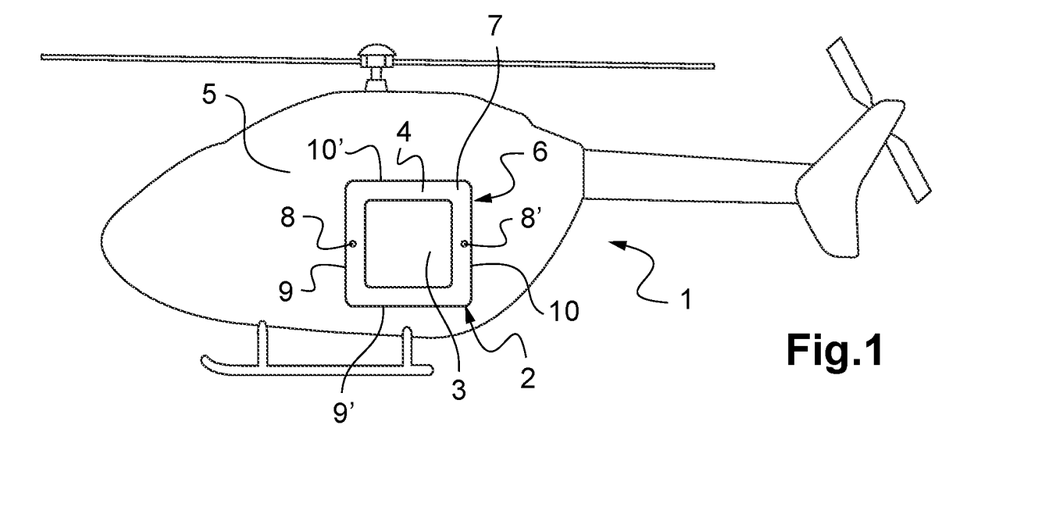
FIG. 1 is a schematic side view of an aircraft according to the disclosure.
Figure 2:
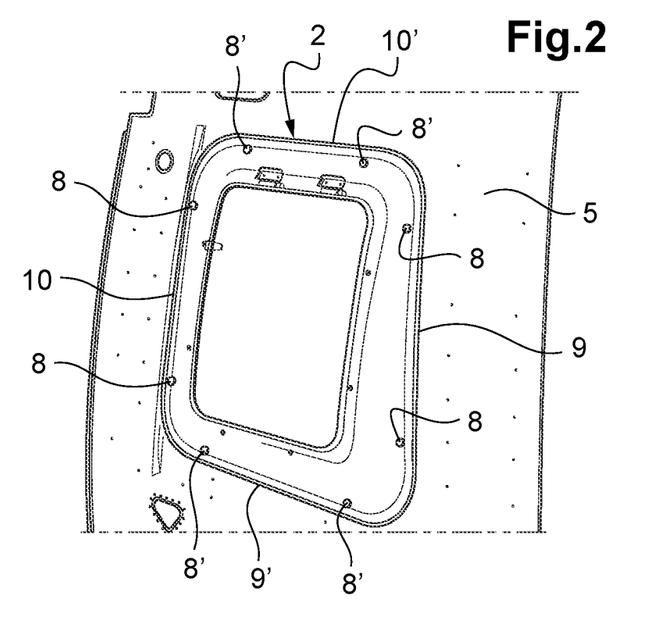
FIG. 2 is a first perspective view from an external orientation of a device according to the disclosure.

As shown in FIG. 1, an aircraft 1 may be in the form of a rotorcraft and, more particularly, a helicopter.

Such an aircraft 1 thus comprises a device 2 for releasing a panel 3 that may advantageously be partially transparent or translucent, such as a porthole, a door or the like. Such a device 2 may comprise a frame 4 configured to be secured to a support 5 forming a structure or a fuselage of the aircraft 1. Such a support 5 has an opening 6; the frame 4 is thus arranged at a periphery 7 of the opening 6.

Such a panel 3 of an aircraft 1 is thus arranged at least opposite the frame 4 and allows the opening 6 to be closed in a sealed manner.

As shown in FIG. 1, such a device 2 comprises at least two ejector members 8 and 8' arranged to either side of the opening 6, for example at two opposing sides 9 and 10.

According to another alternative shown in FIGS. 2 to 5, such a device 2 may comprise two pairs of two ejector members 8 arranged at two opposing sides 9 and 10 and two other pairs of two ejector members 8' arranged at two other opposing sides 9' and 10'.

Moreover, the various ejector members 8 and 8' are advantageously identical to each other.

Figure 6:
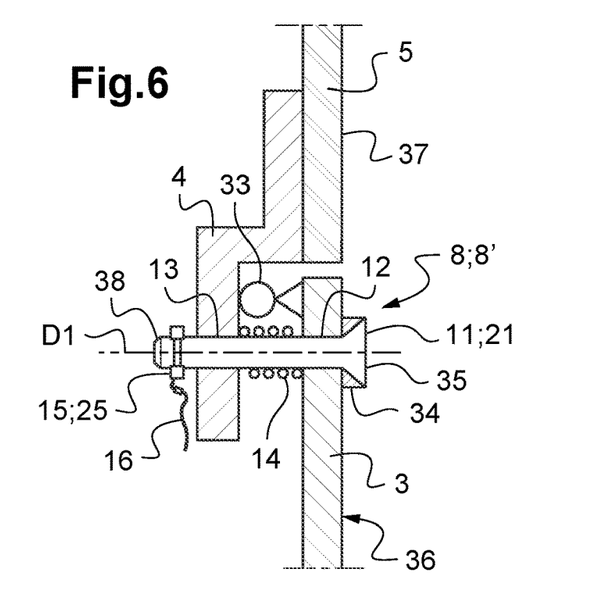
FIG. 6 is a cross-sectional view of a detail of the fastening of the device according to the disclosure.

As shown in FIG. 6, each ejector member 8, 8' comprises a stud 11, 21 oriented in a longitudinal direction D1 substantially perpendicular to the outer face of the panel 3. These studs 11, 21 may, for example, pass through a first aperture 12 of the panel 3 and a second aperture 13 of the frame 4.

Moreover, a coil spring 14 is pre-loaded in compression in the longitudinal direction D1 and is arranged between the panel 3 and the frame 4. Such a spring 14 is moreover arranged coaxially around the stud 11, 21.

Each ejector member 8, 8' also comprises a removable pin 15, 25 that is advantageously arranged inside the aircraft 1. Each removable pin 15, 25 cooperates with a stud 11, 21. Such a removable pin 15, 25 is configured such that, in a working position, it holds the stud 11, 21 in position and allows the panel 3 to be secured to the support 5 and, in a release position, it releases the stud 11, 21 in order, for example, to allow a person to exit the aircraft 1 in an emergency following an accident.

Moreover, one or more seals 33 may be arranged between the panel 3 and the frame 4 and around the entire periphery of the frame 4 in order to ensure the panel 3 provides a tight seal before its possible release.

Each stud 11, 21 may advantageously comprise a head 35. The head 35 may be countersunk and configured to cooperate with a cup washer 34 arranged in contact with an outer face 36 of the panel 3 facing away from the aircraft 1.

Moreover, adjustment means not shown here can also be used to adjust the flushness of the outer face 36 of the panel 3 with the outer surface 37 of the support 5 of the aircraft 1.

Figure 3:
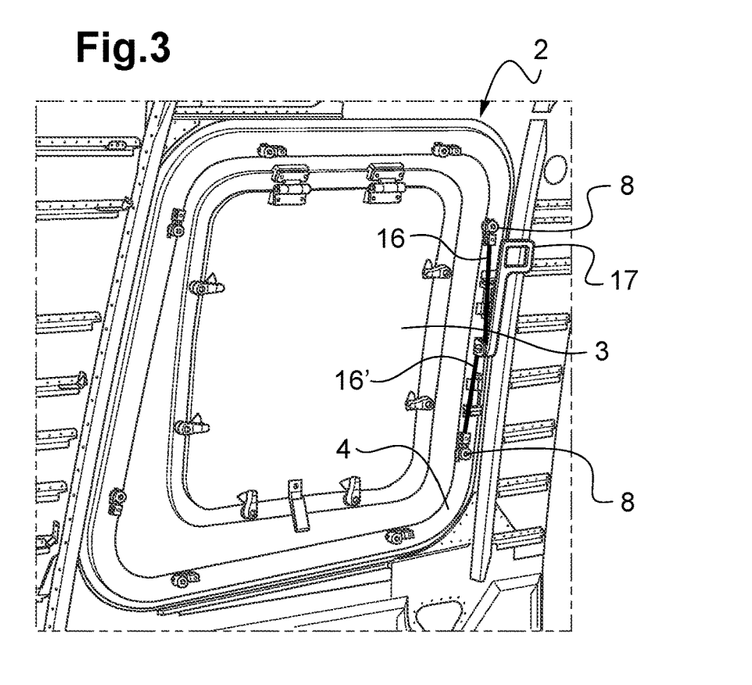
FIG. 3 is a second perspective view from an internal orientation of a device according to the disclosure.
Figure 4:
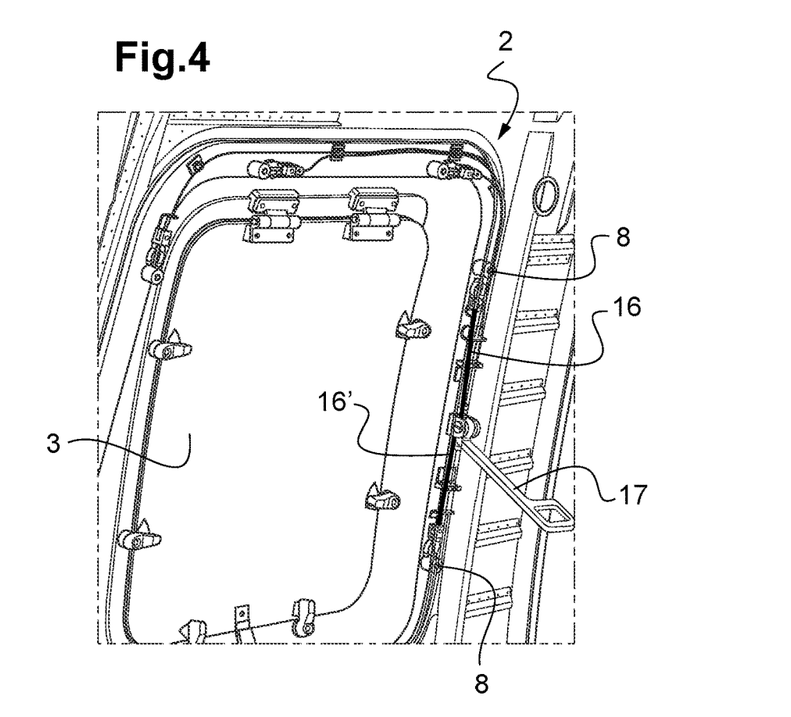
FIG. 4 is a third perspective view from the internal orientation of a device according to the disclosure.

As shown in FIGS. 3 and 4, the device 2 also comprises at least one link 16, 16' connected to the removable pins 15, 25 of the at least two ejector members 8, 8'. These links 16, 16' may, for example, be arranged in series one after another in order to actuate two removable pins 15, 25 of two separate ejector members 8, 8'. The links 16, 16' may also be arranged parallel to each other and thus allow two removable pins 15, 25 to be actuated individually.

Moreover, the device 2 comprises at least one control member 17, such as a lever, for manually applying a pulling force to the link or links 16, 16' and for simultaneously arranging the removable pins 15, 25 of the at least two ejector members 8, 8' in the release position. Such a control member 17 advantageously comprises a degree of rotational mobility in relation to the frame 4.

Figure 5:
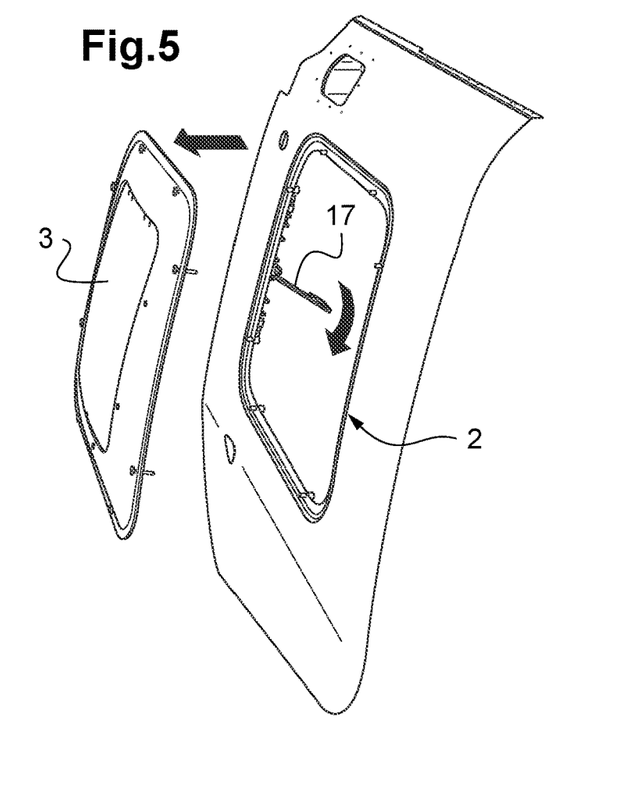
FIG. 5 is a fourth perspective view from the external orientation of a device according to the disclosure.

As shown in FIG. 5, once the control member 17 has been manually actuated by a person, the panel 3 is ejected towards the outside of the aircraft 1 in the longitudinal direction D1 of each of the studs 11, 21 from its head 35 to its foot 38.

Figure 7:
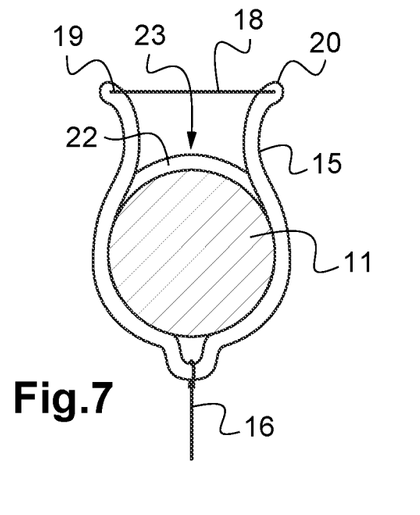
FIG. 7 is a cross-sectional view of a first variant of a removable pin of a device according to the disclosure.
Figure 8:
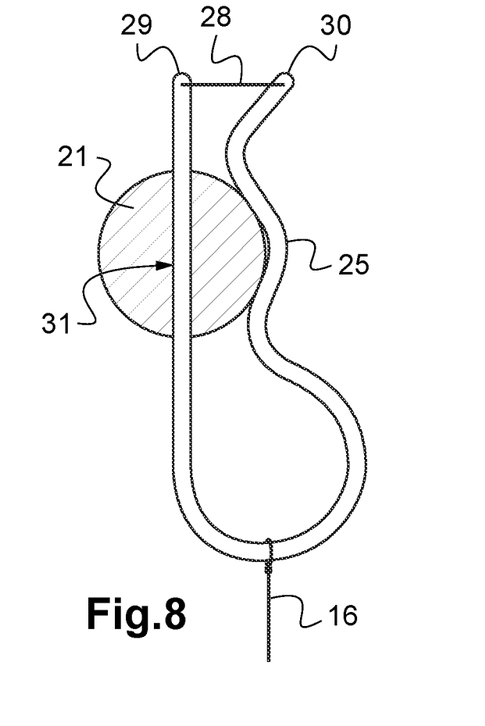
FIG. 8 is a cross-sectional view of a second variant of a removable pin of a device according to the disclosure.

As shown in FIGS. 7 and 8, once installed on their respective studs, the removable pins 15, 25 may each be equipped with a breakable portion 18, 28, each breakable portion 18, 28 being configured to break when the pulling force applied by the control member 17 to the link or links 16, 16' reaches a predetermined threshold value. Moreover, when the breakable portions 18, 28 are broken, the removable pins 15, 25 switch respectively from their working positions to their release positions.

Moreover, the removable pins 15, 25 each comprise two free ends 19, 20, 29, 30, each breakable portion 18, 28 joining the two free ends 19, 20, 29, 30. Such a breakable portion 18, 28 may advantageously comprise a snap wire or the like configured to break when a predetermined pulling force is reached. Such a snap wire is advantageously made from metal and has a diameter preferably between 0.5 mm and 1.5 mm.

A first variant of the removable pin 15 is shown in FIG. 7. In this case, the stud 11 comprises a circular groove 22 arranged at an external cylindrical face 23 of stud 11. The two free ends 19, 20 are inserted into the circular groove 22 in order to position the removable pin 15 in its working position.

Such removable pins 15 may thus be lyre-shaped or omega-shaped.

As shown in FIG. 8, according to a second variant of the removable pin 25, the stud 21 may comprise at least one hole 31 oriented transversely relative to the longitudinal direction D1 of this stud 21. Thus, in order to position the removable pin 25 in its working position, at least one of the two free ends 29, 30 is inserted through the hole 31.

According to this second variant, the removable pins 25 may thus be beta-shaped or R-shaped. Other variants of removable pins inserted through a hole 31 of a stud 21 that are not shown here may be envisaged and may, for example, be in the form of a cylindrical rod, one of the ends of which is secured to a link 16 and the other end of which is secured to a fixed point of the frame 4, optionally with an interposed breakable portion.

Such removable pins 15, 25 may, for example, be formed by metal wires that are substantially elastic so as to be able to be deformed and installed respectively on their stud 11, 21.

Figure 9:
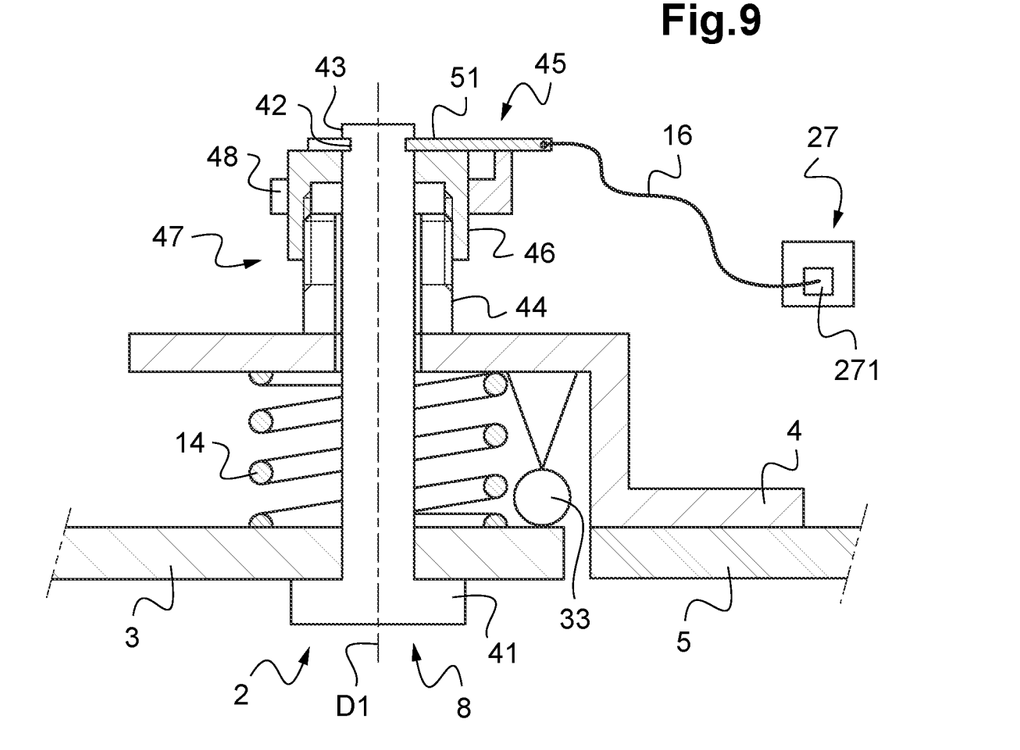
FIG. 9 is a cross-sectional view of a release device comprising a removable pin according to a third variant, according to the disclosure.

As shown in FIG. 9, according to a third variant of the removable pin 45, they may also be formed by metal sheets folded over themselves.

The stud 41 may comprise a circular groove 42 arranged at an external cylindrical face 43.

The removable pin 45 then has a fork 51 intended to cooperate with the circular groove 42.

Moreover, the ejector member 8 in this case comprises an adjustment means 47 for adjusting the flushness of the panel 3 and the structure 5 and for pre-loading the spring 14. Moreover, the tightness achieved by the seal 33 can thus be ensured and adjusted.

Such an adjustment means 47 comprises a threaded sleeve 44 cooperating with a threaded coil 46. The screwing or unscrewing of the threaded coil 46 on the threaded sleeve 44 can be carried out in the conventional manner by means of a wrench and makes it possible to modify the distance between the bearing face of the fork 51 and an inner face of the frame 4 on which the threaded sleeve 44 bears. The threaded sleeve 44 and the threaded coil 46 are arranged coaxially relative to the stud 41.

Figure 10:
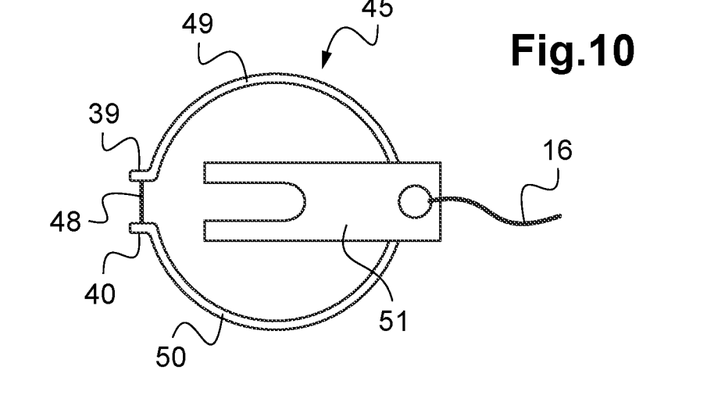
FIG. 10 is a top view showing the third variant of a removable pin of a device according to the disclosure.

As shown in FIG. 10, the removable pin 45 also comprises two deformable portions 49, 50 secured with the fork 51. These two deformable portions 49, 50 additionally cooperate with an outer surface of the threaded coil 46.

As shown, the free ends 39, 40 of the two deformable portions 49, 50 can be arranged opposite each other and connected together by a breakable portion 48 such as a snap wire when the pin 45 is arranged in its working position.

Moreover, as shown in FIG. 9, the control member 27 may comprise at least one actuator 271 configured to be controlled remotely. The actuator 271 can thus be controlled automatically when, for example, an emergency situation is identified by a control unit, or indeed controlled by a pilot of the aircraft 1 wishing to actuate the release device 2, for example from a cockpit of the aircraft 1.

Such an actuator 271 is thus able to receive a control setpoint, for example an electrical setpoint, and apply a pulling force to the link 16 in order to arrange the removable pin 45 in the release position. Moreover, a manually-actuated control member 17 as described above can naturally be combined with the remotely-controlled actuator 271.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

What is claimed is:

1. A device for releasing a panel of an aircraft, the device being configured to be secured to a support, the support having an opening and the device being attached to cover a periphery of the opening, the device comprising:
   a panel configured to be arranged at least opposite the opening,
   at least two ejector members, each of the at least two ejector members comprising:

a stud extending in a longitudinal direction oriented perpendicular to the panel;
a spring pre-loaded in compression in the longitudinal direction, the spring being arranged coaxially around the stud;
a removable pin cooperating with the stud, the removable pin being configured such that, in a working position, it holds the stud in position and allows the panel to be secured to the support and, in a release position, it releases the stud;
at least one link connected to the removable pins of the at least two ejector members; and
at least one control member for applying a pulling force to the link(s) and simultaneously arranging the removable pins of the at least two ejector members in their respective release positions;
wherein the device comprises a frame configured to be secured to the support, the frame being interposed between the support and the panel, the springs of the at least two ejector members being respectively arranged between the frame and the panel.

2. The device according to claim 1 wherein the at least one control member is configured to be actuated manually.

3. The device according to claim 2 wherein the at least one control member comprises a degree of rotational mobility in relation to the frame.

4. The device according to claim 1 wherein the at least one control member comprises at least one actuator configured to be controlled remotely.

5. The device according to claim 1 wherein at least one of the removable pins comprises a breakable portion, the breakable portion being configured to break when the pulling force reaches a predetermined threshold value, and wherein, when the breakable portion is broken, the at least one removable pin switches from the working position to the release position.

6. The device according to claim 5 wherein the at least one removable pins comprises two free ends, each breakable portion being secured with the two free ends once the at least one removable pins is arranged in the working position.

7. The device according to claim 6 wherein at least one of the studs comprises at least one circular groove arranged at an external cylindrical face of the at least one stud and wherein, in order to position the at least one removable pin in the working position, the two free ends are inserted into the at least one circular groove.

8. The device according to claim 5 wherein at least one of the studs comprises at least one hole oriented transversely relative to the longitudinal direction of the at least one stud and wherein, in order to position the at least one removable pin in the working position, at least one of the two free ends is inserted through the at least one hole.

9. The device according to claim 5 wherein the breakable portion is formed by a snap wire.

10. The device according to claim 1 wherein, the opening comprising four sides, the device comprises eight ejector members positioned in pairs at each of the four sides of the opening.

11. An aircraft comprising a support having an opening and the device for releasing panel of the aircraft, the device being secured to the support and being attached to cover a periphery of the opening, the panel being arranged at least opposite the opening
wherein the device is according to claim 1.

12. The device according to claim 1 wherein the frame is connected to the support and is spaced from the panel.

13. The device according to claim 12 wherein the frame has a first portion connected to the support and a second portion spaced from the first portion and the panel.

14. The device of claim 13 wherein the second portion is spaced a first distance laterally from the first portion and is spaced a second distance laterally from the panel.

15. The device of claim 14 wherein the second distance is greater than the first distance.

16. A device for releasing a panel of an aircraft, the device configured to be secured to a support having an opening with the device covering a periphery of the opening, the device comprising:
a panel configured to be disposed opposite the opening,
at least two ejectors, each of the at least two ejectors comprising:
a stud extending in a longitudinal direction oriented transverse to the panel;
a spring pre-loaded in compression in the longitudinal direction, the spring being arranged coaxially around the stud;
a removable pin cooperating with the stud, the removable] pin being configured such that, in a working position, it holds the stud in position and allows the panel to be secured to the support and, in a release position, it releases the stud;
at least one link connected to the removable pins of the at least two ejectors; and
at least one control member for applying a pulling force to the at least one link to move the removable pins from the working position to the release position;
wherein the device comprises a frame configured to be secured to the support, the frame interposed between the support and the panel, the springs of the at least two ejectors respectively arranged between the frame and the panel.

17. The device according to claim 16 wherein the frame has a first portion connected to the support and a second portion spaced from the first portion and the panel.

18. The device of claim 17 wherein the second portion is spaced a first distance laterally from the first portion and is spaced a second distance laterally from the panel.

19. A panel assembly for releasably securing a panel of an aircraft to a support, the support having an opening, the panel assembly secured to the support to cover a periphery of the opening, the panel assembly comprising:
a panel disposed opposite the opening,
two ejector members, each of the two ejector members comprising:
a stud extending in a longitudinal direction transverse to the panel;
a pre-loaded compressed spring coaxially disposed about the stud;
a removable pin cooperating with the stud, the removable pin, when in a working position holding the stud to allow the panel to be secured to the support, and, the removable pin, when in a release position, releasing the stud to allow the panel to move away from the support;

at least one link connected to the removable pins of the at least two ejector members; and at least one control member for applying a pulling force to the at least one link to cause the removable pins of the at least two ejector members to move from the working positions to their respective release positions;

the panel assembly comprising a frame configured to be secured to the support and interposed between the support and the panel, the springs of the at least two ejector members compressed between the frame and the panel.

20. The device according to claim 18 wherein the frame has a first portion connected to the support and a second portion spaced from the first portion and the panel and wherein the second portion is spaced a first distance laterally from the first portion and is spaced a second distance laterally from the panel.

\* \* \* \* \*